UNITED STATES PATENT OFFICE.

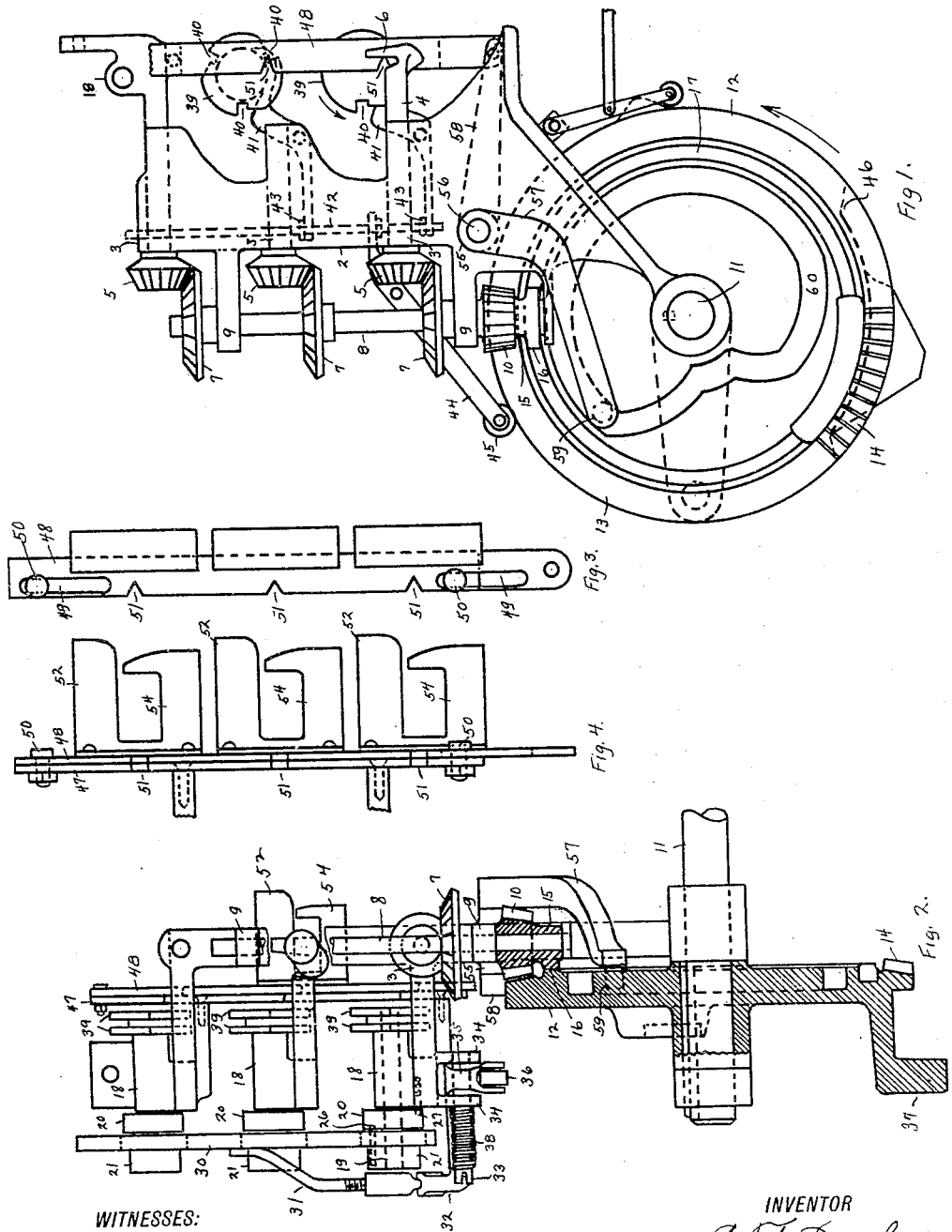

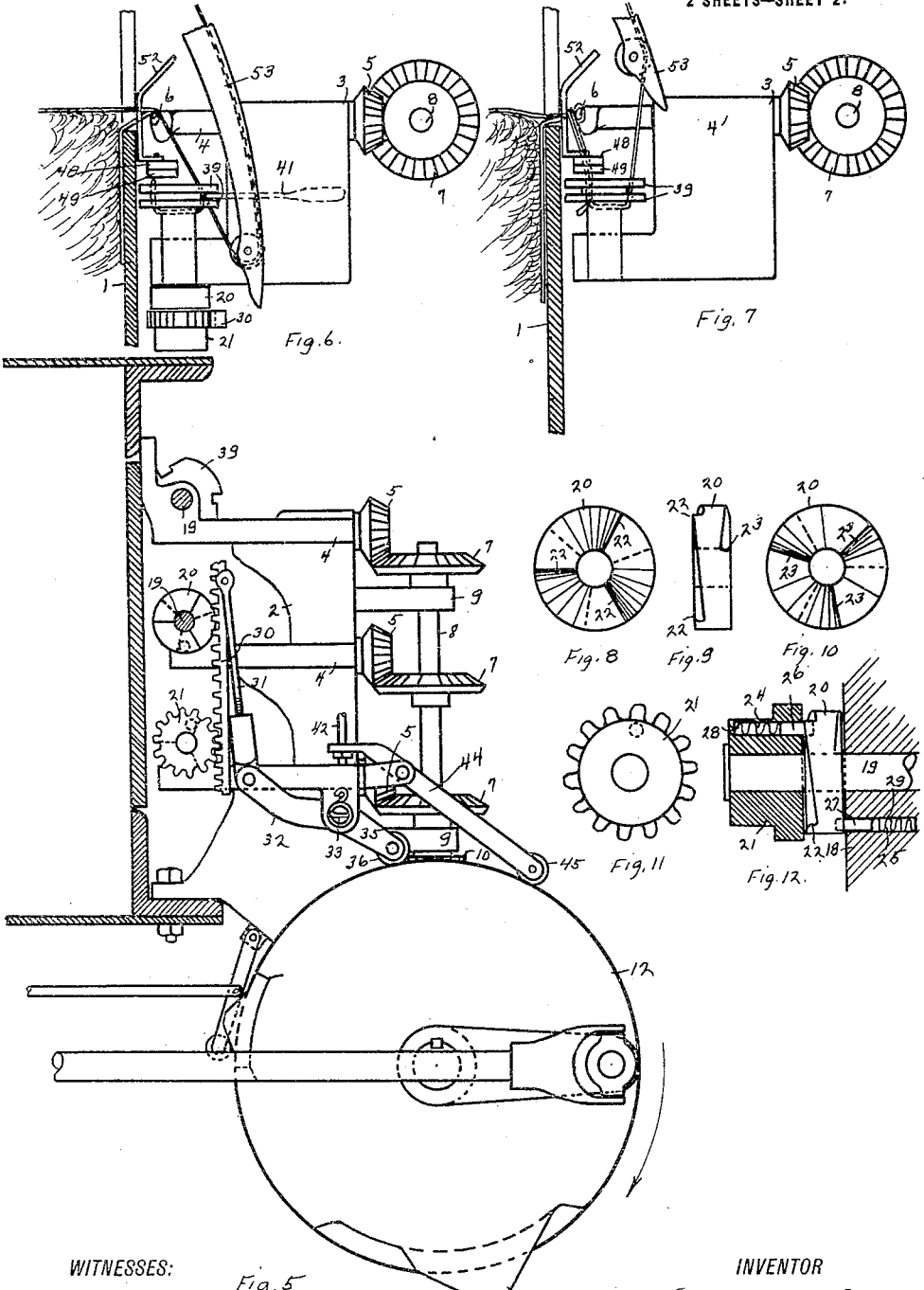

ANDREW T. DUDLEY, OF HOUSTON, TEXAS.

TWISTER.

1,257,467.  Specification of Letters Patent.  Patented Feb. 26, 1918.

Application filed October 20, 1915. Serial No. 56,856.

*To all whom it may concern:*

Be it known that I, ANDREW T. DUDLEY, a citizen of the United States, residing at Houston, in the county of Harris and State of Texas, have invented certain new and useful Improvements in Twisters, of which the following is a specification.

This invention relates to new and useful improvements in a twister, and is specially designed for twisting together the ends of the baling wires employed in forming bales of hay or other similar material.

The object of the invention is to provide a device of the character described by means of which baling wire may be secured around bales.

Another object of the invention resides in the provision of tension fingers by means of which the wire is securely held in the disks excepting during the rotation thereof and released so as to permit a certain amount of slippage while the disks are being rotated.

A further feature of the invention resides in the provision of cutters whereby the wire is severed after it is secured around the bale.

With the above and other objects in view the invention has particular relation to certain novel features of construction, operation, and arrangement of parts, an example of which is given in this specification and illustrated in the accompanying drawings wherein:—

Figure 1 is a side elevation of the device, with certain parts removed for the sake of clearness, Fig. 2 is a front view thereof, Figs. 3 and 4 are edge and side views respectively of the cutters, Fig. 5 is a side elevation showing a reverse view from that shown in Fig. 1, Fig. 6 shows a plan view showing the needle inserted through the device, Fig. 7 shows a plan view with the needle in a partially withdrawn position, and Figs. 8 to 12 show detached parts of the mechanism for operating the disks.

Referring now more particularly to the drawing wherein like numerals of reference designate similar parts in each of the figures the numeral 1 refers to the baling chamber wherein the bale is formed and to the side of which the twisting device herein described is secured. The numeral 2 refers to the twister frame which is secured to the baling chamber and has three parallel bearings 3, 3, 3, one above the other wherein rotate the respective shafts 4, 4, 4, to the outer ends of which are secured bevel pinions 5, 5, 5, and the inner ends of which are formed into twister hooks 6, 6, 6. The pinions 5 are in mesh with the respective bevel gear wheels 7, 7, 7, which are fixed on the vertical shaft 8 rotatable in the bearings 9, 9 projecting out from the frame 2. The lower end of the shaft 8 has the bevel pinion 10 fixed thereon for a purpose to be hereinafter set forth. A drive shaft 11 is provided and is arranged to be clutched with and declutched from a suitable motor, the motor and clutch mechanism not being shown since they form no part of the twisting device proper. Fixed upon one end of the shaft 11 is the disk 12, the rim of whose face is beveled as at 13, a section of said beveled portion having gear teeth 14, which mesh with and cause a complete rotation of the pinion 10 as the disk rotates. The pinion 10 has an extended neck 15, whose inner side is formed into an oblong face 16 which rests against the annular rib, or track 17, on the face of the disk 12, and by means of which the pinion 10 is prevented from turning except when in engagement with the teeth 14. The portion of the track opposite the teeth 14 is removed so that when said teeth mesh with the pinion 10 said pinion will be free to rotate. The rotation of the pinion 10 is imparted, through the mechanism just described, to rotate the shafts 4 and the twister hooks 6, the mechanism being so geared that a rotation of the pinion 10 will cause two rotations of said hooks.

Disposed at right angles to the shafts 4 and rotatably mounted in the bearings 18, 18, 18, carried by the frame 2, are the disk shafts 19, 19, 19, and fixed upon the outer ends of these shafts are the clutch disks 20, 20, 20, said shafts extending beyond said disks and having the respective spur gear wheels 21, 21, 21 loosely mounted thereon. The opposite sides of each clutch disk 20 has three radiating shoulders arranged at uniform distances apart, one side of each shoulder being abrupt and the other sloping, the shoulders on opposite sides of the disk sloping in the reverse direction and being arranged in staggered relation. The faces of each of the gears 21 and the bearings 18 adjacent the corresponding clutch disk 20, have the respective sockets 24, 25, in which are the respective pins 26 and 27 seated on the corresponding resilient seats 28 and 29, said pins normally projecting behind the corresponding shoulders 22 and 23. A rack member 30 is provided, which is in mesh with the gear wheels 21 and which is reciprocated through the link 31. One end of this link is pivoted to said rack member and the other end thereof is pivoted to one end of the arm 32, which is integral with the shaft 33, this last-mentioned shaft being rotatably mounted in suitable bearings 34, 34 carried by the frame 2. The shaft 33 also has the arm 35 extending at right angles thereto and the free end of which has a roller bearing 36 arranged in the path of the cam 37 carried by the back of the disk 12 and when said cam contacts with said bearing it operates to partially rotate the shaft 33 and exert a downward pull on the rack member 30, thereby rotating the gear wheels 21 one-third of a revolution. The pins 26 engaging behind the shoulders 22 force the clutch disks 20 and the shafts 19 on which they are mounted, to perform one-third of a rotation and the pins 27 during this movement are depressed by the sloping sides of the shoulders 23 until they drop behind the abrupt sides of said shoulders and lock the shafts 19 against backward rotation. The shaft 33 has a torsional spring 38 coiled therearound one end of which is secured to the shaft and the other end to its bearing. When the cam 37 has passed the bearing 36 this spring will operate to reverse the movement of the link 31, causing the rack member to move upwardly, reversing the rotation of the gears 21 and carrying the pins 26 back until they engage behind the next succeeding shoulder 22. The inner end of each of the shafts 19 has two disks 39 fixed thereon and spaced apart, each of said disks having three peripheral alined notches 40 to receive the wire, said notches being spaced a uniform distance apart.

Tension levers 41, 41, 41 are provided, which are pivoted to the frame 2. One end of each lever is arcuate and rests between the corresponding disks 39 and the opposite ends of the levers have vertically alined orifices through which the rod 42 extends loosely, said rod having nuts 43 secured thereon and normally in contact with the ends of the corresponding levers 41. Pivoted to this rod is the lever 44, which is fulcrumed upon the frame 2 and whose outer end has a roller bearing 45 arranged in the path of the depression 46 which is in the periphery of the disk 12. The bearing 45 normally rests against the periphery of the disk 12 which operates through the lever 44 the rod 42 and the tension levers 41 to hold the arcuate ends of said last-mentioned levers firmly against the wires resting in the notches of the disks 39. The mechanism is so geared that when the twister hooks 6, 6, 6 begin to turn the depression 46 will be opposite the bearing 45 and the tension on said levers 41 will be released. The wires will thus be firmly held in said disks when the hooks are stationary but when they begin to turn the tension will be released, permitting a certain amount of slippage so as to prevent breaking of the wires by the turning of said hooks. Arranged alongside the twister hooks are the vertical cutter bars 47 and 48, the former of which is fixed to the frame and the latter of which has vertical slots 49, 49 therethrough through which the bolts 50, 50 extend. These bolts are secured to the bar 47 and have enlarged heads to secure the bars together and permit the vertical movement of the latter relative to the former. These bars have alined notches 51, 51, 51 opposite the twister hooks 6, said notches having converging cutting edges and the respective disks 39 carry the corresponding wires into said notches. Fixed to the bar 48 are the laterally extending wings 52, 52, 52, arranged slightly above the corresponding notches 51, and the wires are carried by the needles 53 underneath said wings, which operate to cause the wires to engage around the hooks 6 as is illustrated in Fig. 6. Arranged underneath the wings 52 and in alinement therewith are the stripper hooks 54, 54, 54, which are also fixed to the bar 48. These hooks engage underneath the wires and strip the twisted ends thereof from said hooks when the bar 48 is moved upwardly as will presently be described.

Rotatably mounted in the bearing 55, carried by the frame 2 is a shaft 56 and fixed to the respective ends thereof are the oppositely extending arms 57 and 58, the free end of the latter of which is pivoted to the lower end of the bar 48 and the free end of the former of which has the roller bearing 59, which projects into the eccentric groove 60 in the face of the disk 12. This groove is cam shaped and is formed so that its outer wall will bear against the bearing 59 and after the knot is formed will force the free end of the arm 57 in toward the center of the disk 12, thereby elevating the free end of the arm 58 and the bar 48 connected thereto thus severing the wires resting in the notches 51 and stripping the twisted wire off the twister hooks 6, 6, 6, and said groove is so formed as to hold said bar temporarily in its elevated position while the needle 53 is being withdrawn so that the wire as it is carried back by the needle will engage against the outer end of the corresponding hook 54, and is there held until the bar descends, when said wire passes under the wings 52, 52, 52 and is by them directed around the twister hooks.

The operation of the device is as follows:—

When the bale is completed the disk 12 is clutched with the driving means through the operation of a mechanism forming no part of this invention and which it will not be necessary to describe, and said mechanism also operates to drive the needle around the completed bale and into the position shown in Fig. 6. The needle carries the wire into engagement with the opposing notch 40 of the disks 39. Thereupon the cam 37 comes into contact with the opposing bearing 36, operating through the mechanism described to rotate the shaft 33 and exert a downward pull on the rack member 30 through the link 31. The disks 39, 39 are thereby turned one-third of the way around carrying the wire down into the opposing notches 51 and from thence it passes around the twister hooks 6. The bevel teeth 14 have at this point reached the pinion 10 and impart to it a single rotation, causing a double rotation of the hooks 6 which twist the wire and secure it around the bale. Simultaneously with this movement of said hooks 6 the bearing 45 drops into the depression 46, thereby releasing the tension levers 41 from the wire and permitting the necessary slippage of the wire in the disks 39. When the wires have been secured as explained the free end of the arm 57 is depressed and the corresponding end of the arm 58, and the bar 48, are elevated, severing the wires and stripping them from the hooks. The needle 53 is then withdrawn leaving the free end of the wire secured in the disks 39 and drawing said wires around the outer ends of the hooks 54 and across the baling chamber preparatory to the formation of another bale. Meanwhile the cam 37 has released the bearing 36 and the tension of the spring 38 will operate to reverse the rotation of the shaft 33 with the result that an upward pull will be exerted on the rack 30 reversing the rotation of the gears 21 but without effect upon the shafts 19 and the disks 39 fixed thereon; also the bearing 45 will have passed the depression 46 and will again be forced outwardly by the periphery of the disk 12, again exerting a tension against the wires in disks 39, and securing them firmly therein, through the mechanism hereinbefore described, and the device will then be in position to repeat the operation of securing the wires around the next succeeding bale.

What I claim is:—

1. A device of the character described including a frame, a plurality of twister hooks, means for rotating said hooks for twisting a knot in baling wire, and combined cutter and stripping means adjacent the hooks for cutting the baling wire and stripping from the hooks the knots formed thereon.

2. A device of the character described including a frame, a plurality of twisting hooks, means for rotating said hooks, a reciprocating cutter bar arranged alongside of said hooks, and means fixed to the cutter bar for automatically stripping from the hooks the wire looped therearound.

3. A wire twisting device including a frame, a plurality of twister hooks, a common means for rotating said hooks simultaneously, a notched reciprocating cutter bar arranged alongside said hooks, disks having wire-engaging means, means for imparting successive partial rotations to said disks and a tension mechanism engaging against the wire in each disk, and securing the wire therein when the twister hooks are at rest but releasing the same when the twister hooks rotate.

4. A wire twisting device embodying in its structure a plurality of twister hooks, a means for rotating said hooks, coöperating cutters arranged alongside said hooks, a disk having wire-engaging means arranged opposite each hook to engage with the wire to be twisted and carry the same between said cutters, means for imparting successive partial rotations to said disks, and means movable with the cutter bar for stripping the wire from said hooks.

5. A wire twisting device embodying in its structure a plurality of twister hooks, a means for rotating said hooks coöperating cutters arranged adjacent said hooks, a disk having wire-engaging means arranged opposite each hook to engage with the wire to be twisted and carry the same between said cutters, means for imparting successive partial rotations to said disks, and a tension device engaging against the wire in each disk and securing the same therein when the twister hook is at rest but releasing the wire when the twister hook rotates.

6. A device of the character described including a frame, a plurality of twister hooks, a disk in which the wire is gripped, means for rotating said hooks, and a guide for each hook against which the wire to be twisted engages and by means of which said wire is directed into engagement with said hooks.

7. A device of the character described including a frame, a plurality of twister hooks, means for gripping the wire, a common means for rotating said hooks simultaneously and a wire guide for each hook for directing the wire into engagement therewith.

8. A device of the character described including a frame, a plurality of twister hooks, means for rotating said hooks, a single reciprocating cutter bar arranged along the side of said hooks, and a wire guide carried by the cutter bar for each hook.

9. A device of the character described including a frame, a twister hook rotatably mounted in the frame, and a movable wire guide carried by a movable element whereby the wire to be twisted is directed into engagement with the hook.

10. A device of the character described including a frame, a plurality of twister hooks, means for rotating said hooks, a disk having wire engaging means arranged opposite each hook to engage with the wire to be twisted, a tension device engaging against the wire in each disk and securing the same therein when the twister hook is at rest and means for automatically releasing said tension device from the wire when the twister hook rotates.

11. A wire twisting device including a plurality of twister hooks, means for actuating said hooks, and a single combined cutter and guide mechanism coöperating with all of said hooks.

12. A wire twisting device including a disk having a wire engaging means, means for imparting successive rotations to said disk, and a movable releasable tension mechanism for holding and releasing the wire in said disk at intervals.

In testimony whereof I have signed my name to this specification in the presence of two subscribing witnesses.

ANDREW T. DUDLEY.

Witnesses:
 ANNIE CARY,
 FLORENCE GREENOUGH.

Copies of this patent may be obtained for five cents each, by addressing the "Commissioner of Patents Washington, D. C."